United States Patent
Macnair, Jr. et al.

(10) Patent No.: US 6,907,604 B1
(45) Date of Patent: Jun. 14, 2005

(54) INSTANT INTEGRATION MODEL

(75) Inventors: Douglas G. Macnair, Jr., Round Rock, TX (US); Rory K. O'Loughlin, Austin, TX (US); Gaston M. Barajas, Austin, TX (US)

(73) Assignee: Dell Products L.P., Round Rock, TX (US)

(*) Notice: Subject to any disclaimer, the term of this patent is extended or adjusted under 35 U.S.C. 154(b) by 525 days.

(21) Appl. No.: 09/668,611

(22) Filed: Sep. 22, 2000

(51) Int. Cl.[7] ................................................ G06F 9/45
(52) U.S. Cl. ..................................................... 717/175
(58) Field of Search ............................... 717/169, 175; 705/52; 713/2

(56) References Cited

U.S. PATENT DOCUMENTS

| | | | | |
|---|---|---|---|---|
| 5,113,518 A | * | 5/1992 | Durst et al. ................. | 713/200 |
| 5,325,532 A | * | 6/1994 | Crosswy et al. ............... | 713/2 |
| 5,479,612 A | * | 12/1995 | Kenton et al. .............. | 713/200 |
| 5,515,524 A | * | 5/1996 | Lynch et al. .................. | 703/13 |
| 5,748,485 A | * | 5/1998 | Christiansen et al. ........ | 700/234 |
| 5,894,571 A | | 4/1999 | O'Connor ....................... | 713/2 |
| 5,970,252 A | * | 10/1999 | Buxton et al. .............. | 717/166 |
| 6,006,035 A | * | 12/1999 | Nabahi ....................... | 717/175 |
| 6,067,618 A | * | 5/2000 | Weber ............................. | 713/1 |
| 6,134,324 A | * | 10/2000 | Bohannon et al. ............ | 705/52 |
| 6,247,128 B1 | * | 6/2001 | Fisher et al. ................. | 713/100 |
| 6,298,443 B1 | * | 10/2001 | Colligan et al. ............ | 713/200 |
| 6,324,691 B1 | * | 11/2001 | Gazdik ....................... | 717/178 |
| 6,418,554 B1 | * | 7/2002 | Delo et al. ................... | 717/174 |
| 6,427,236 B1 | * | 7/2002 | Chamberlain et al. ...... | 717/174 |
| 6,543,047 B1 | * | 4/2003 | Vrhel, Jr. et al. ........... | 717/121 |
| 2002/0013939 A1 | * | 1/2002 | Daynes et al. ................ | 717/11 |
| 2003/0088515 A1 | * | 5/2003 | Cooper et al. ................ | 705/50 |

* cited by examiner

Primary Examiner—John Chavis
(74) Attorney, Agent, or Firm—Haynes and Boone, LLP

(57) ABSTRACT

A method that includes receiving a storage device that includes an image is provided. The image is loaded onto the storage device by a vendor of the storage device and includes a first program and a second program. The second program is removed from the image on the storage device in response to comparing an order list to an image list. The first program is integrated into an operating system on the storage device.

11 Claims, 5 Drawing Sheets

| Operating System 210 | Driver 220a | Driver 220b | Driver 220c | Application 230a | Application 230b | Application 230c | ... | 240 |

| Operating System 210 | Driver 220a | Driver 220b | Driver 220c | Application 230a | Application 230b | Application 230c | ... | 240 |

| Operating System 210 | Driver 220a | Driver 220b | Driver 220c | Application 230a | Application 230c | ... | 240 |

| Operating System 210 | Driver 220a | Driver 220b | Driver 220c | Application 230a | Application 230c | Application 230d | ... | 240 |

INSTANT INTEGRATION MODEL

This application relates to co-pending U.S. patent application Ser. No. 09/467,706, filed on Dec. 20, 1999, entitled "Apparatus and Method for Configuring Computers", naming Pat Condon, Mike Finucane, Maurice Hayes, Patrick O'Grady, Paul Reid, David Speight, and John White as inventors.

This application relates to co-pending U.S. patent application Ser. No. 09/333,786, filed on Jun. 15, 1999, entitled "Method and Apparatus for Testing Custom-Configured Software/Hardware Integration in a Computer Build-to-Order Manufacturing Process", naming Thomas Vrhel Jr., Gaston M. Barajas, Paul J. Maia, and W. D. Todd Nix as inventors.

This application relates to U.S. Pat. No. 5,894,571, filed on Apr. 13, 1999, entitled "Process for Configuring Software in a Build-to-Order Computer System", naming Clint H. O'Conner as inventor.

The patent and co-pending applications are incorporated by reference in their entirety, and are assigned to the assignee of this application.

BACKGROUND

The disclosures herein relate generally to providing build-to-order computer systems and more particularly to installing software programs in a build-to-order computer system.

As part of a build-to-order model for manufacturing computer systems, a customer selects an operating system and other programs to be included in a build-to-order computer system when the customer places an order. The manufacturer assembles the system and installs the software specified by the customer onto the system. The process of installing the software can be a time-consuming process for the manufacturer. It would be desirable to reduce the amount of time it takes to install software specified by a customer in a build-to-order computer system.

Therefore, what is needed is a system and method to allow a manufacturer to more efficiently install software in a computer system.

SUMMARY

One embodiment, accordingly, provides a method that includes receiving a storage device that includes an image. The image is loaded onto the storage device by a vendor of the storage device and includes a first program and a second program. The second program is removed from the image on the storage device in response to comparing an order list to an image list. The first program is integrated into an operating system on the storage device.

A principal advantage of this embodiment is that it allows a manufacturer to more efficiently install software in a build-to-order computer system. The software installation process can be performed using two mutually exclusive phases. These phases provide a manufacturer with flexibility in installing software and allow a manufacturer to more efficiently provide a build-to-order computer system.

DETAILED DESCRIPTION

Figure 1A:
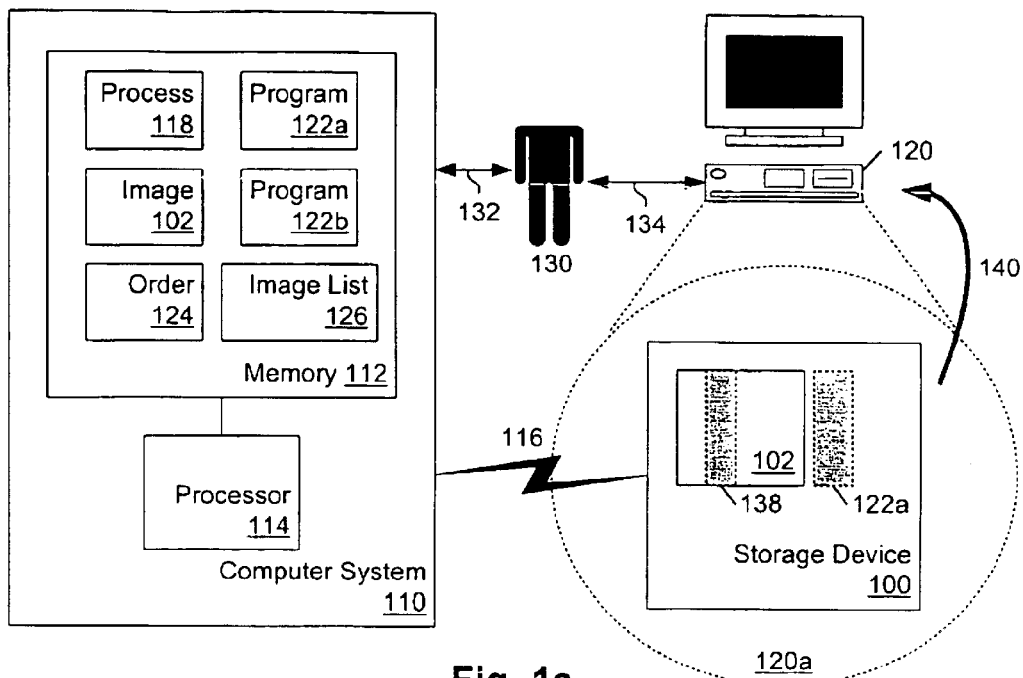
FIG. 1a is a diagram illustrating a first embodiment of a storage device coupled to a computer system.

FIG. 1a is a diagram illustrating an embodiment of a storage device 100 coupled to a computer system 110. Computer system 110 includes a processor 114 coupled to a memory 112. Memory 112 includes image 102, image list 126, process 118, program 122a, program 122b, and order information 124. Storage device 100 is coupled to computer system 110 using a connection 116. Connection 116 may be any suitable component, device, or system for operatively coupling computer system 110 and storage device 100 such as a cable, a local area network, a global communications network such as the Internet, or a wireless communications system. In one embodiment, storage device 100 is included in a build-to-order computer system 120. In this embodiment, build-to-order computer system 120 is coupled to computer system 110 via connection 116. In an alternative embodiment, storage device 100 is directly coupled to computer system 110 via connection 116. In this alternative embodiment, storage device 100 is eventually installed in build-to-order computer system 120. Computer system 110 and build-to-order computer system 120 are each configured to receive inputs from and provide outputs to a user 130 as indicated by arrows 132 and 134, respectively.

In the embodiment of FIG. 1a, storage device 100 may be any suitable device or devices configured to store one or more programs such as a hard disk drive or another type of magnetic storage device, a redundant array of inexpensive drives (RAID) system, or an optical storage device.

The process of installing software onto storage device 100 for use in build-to-order computer system 120 is divided into two mutually exclusive phases. The first phase, the copy phase, involves copying the contents of a program directly into one or more directories. The second phase, the integration phase, involves integrating the program into an operating system. FIG. 1a illustrates an embodiment configured to implement these two phases.

In FIG. 1a, image 102 is included in memory 112. Image 102 includes an operating system and one or more programs. Image 102 is created using the copy phase of installing software. The operating system and the programs are copied into image 102 such that the contents of the operating system and the programs are stored directly into a directory structure without the need of a temporary directory. The operating system and programs are in image 102, however, in a pre-integrated state. In particular, the programs have not been integrated into the operating system in image 102 and the operating system has not performed its initial boot and plug-n-play detection. The copy phase also creates image list 126. Image list 126 includes a list that indicates the operating system and the programs included in image 102. Image 102 and image list 126 may be created by computer system 110 or may be created on a separated computer system and copied to computer system 110.

Image 102 is copied onto storage device 100 over connection 116 by process 118 as shown by image 102 being included in storage device 100. In one particular embodiment, image 102 may be copied onto storage device 100 by a vendor of the storage device prior to storage device 100 being received by a computer manufacturer. Subsequent to image 102 being copied onto storage device 100, the integration phase may be performed to integrate the programs in image 102 into the operating system. In a build-to-order manufacturing model, however, a customer may specify a set of programs to be included that differs from the set of programs included in image 102. Accordingly, before the integration phase is performed, programs may be removed from image 102 on storage device 100 and or added to storage device 100.

The set of programs desired by a customer is included in order information 124 and may be stored in order information 124 as an order list. The order list 124 is compared to image list 126. If the order list 124 and image list 126 list an identical set of programs, then no programs need to be added and no programs need to be removed from storage device 100 to create the customer's build-to-order computer system 120. If the order list 124 and image list 126 do not list an identical set of programs, then either one or more programs need to be added or one or more programs need to be removed from storage device 100 to create the customer's build-to-order computer system 120. In this case, the integration phase is performed after removing any programs from image 102 on storage device 100 and loading any additional programs onto storage device 100.

Where a customer's order does not include a program or programs included in image 102, that program or-programs are removed from image 102 on storage device 100. A shaded region 138 within image 102 on storage device 100 illustrates this possibility. Shaded region 138 represents a program that is deleted from image 102 on storage device 100 by process 118. In one particular embodiment, the program is removed by removing its associated file allocation entry in a file allocation table in a Windows operating system such as Windows 2000, Windows NT, Windows 98, and Windows 95. In addition, an entry associated with the program in an integration list is removed. The integration list is used by the integration phase to cause programs to be integrated into operating system. The programs remaining in image 102 on storage device 100 may be compacted as illustrated in FIGS. 2b and 2c, as discussed below. It may be noted that a program may be safely removed from image 102 because the program has not yet been integrated into the operating system.

Where a customer's order includes a program or programs that are not included in image 102, that program or programs are loaded onto storage device 100. A shaded region 122a on storage device 100 illustrates this possibility. Computer system 110 includes program 122a and program 122b. In the example shown in FIG. 1a, a customer's order includes program 122a. Accordingly, process 118 causes program 122a to be loaded onto storage device 100 as indicated by shaded region 122a. In addition, an entry associated with the program is added to an integration list to cause the program to be integrated into an operating system during the integration phase. Although not loaded onto storage device 100 in this example, program 122b is shown in FIG. 1a to illustrate that other programs may be stored on computer system 110 and may be caused to be loaded onto storage device 100 by process 118.

Figure 2A:
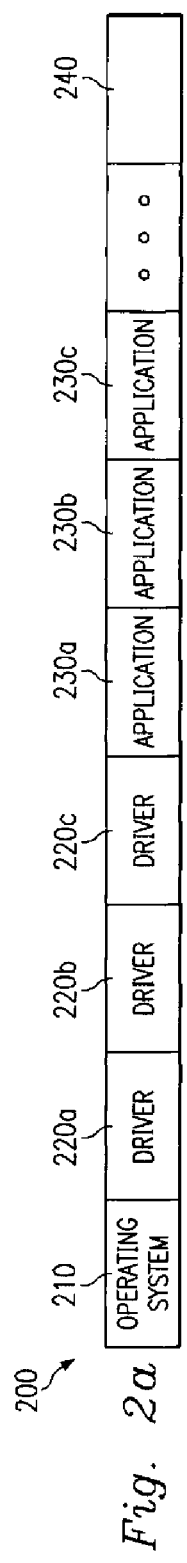
FIG. 2a is a diagram illustrating a first example of contents of a storage device.
Figure 2B:
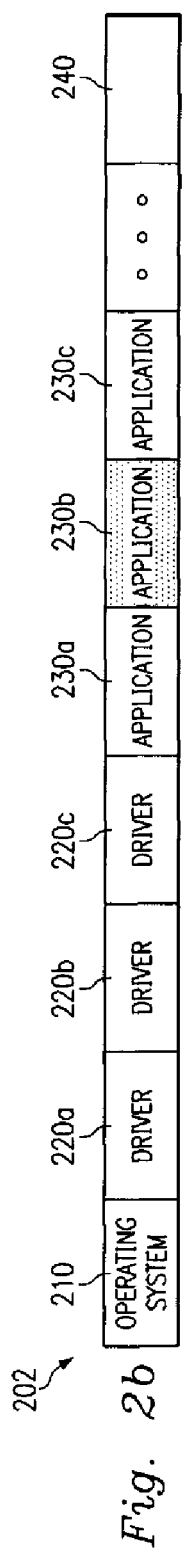
FIG. 2b is a diagram illustrating a second example of contents of a storage device.
Figure 2C:
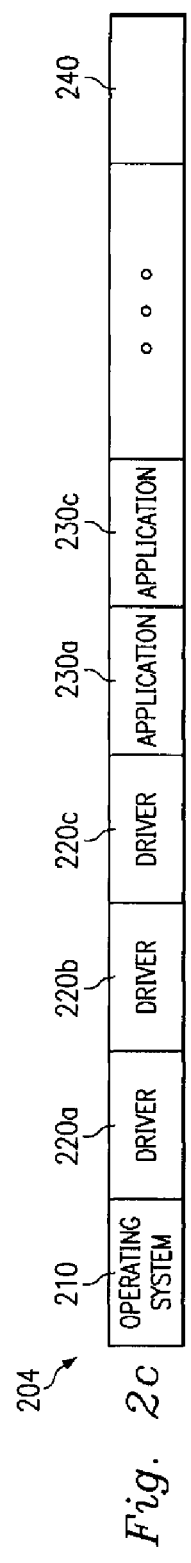
FIG. 2c is a diagram illustrating a third example of contents of a storage device.
Figure 2D:
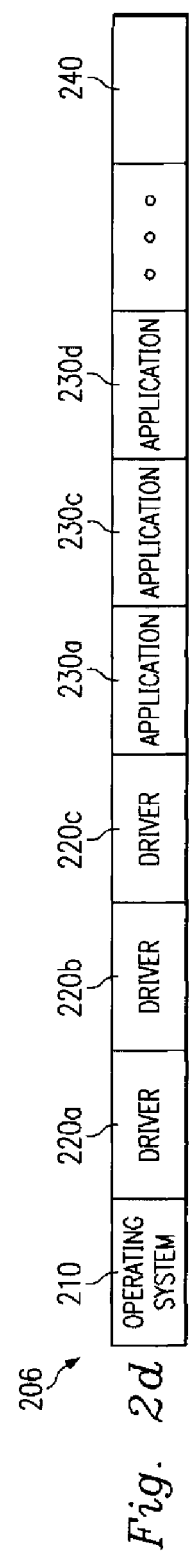
FIG. 2d is a diagram illustrating a fourth example of contents of a storage device.

FIGS. 2a, 2b, 2c, and 2d are diagrams illustrating examples of contents of a storage device at various times in the process of installing software. These Figs. illustrate another example of the process just described. As shown in FIG. 2a, contents 200 of a storage device includes an operating system 210, a driver 220a, a driver 220b, a driver 220c, an application 230a, an application 230b, and an application 230c. These programs comprise an image as described above. The storage device also includes unused space 240. As seen in FIG. 2a, the image has been loaded onto the storage device.

A customer order may not include application 230b. Accordingly, application 230b is removed as indicated by the shaded portion in contents 202 of FIG. 2b. Once removed, the shaded region includes unused space on the storage device. This unused space may be compacted to result in contents 204 shown in FIG. 2c. As may be seen, the contents of application 230c have been moved to occupy at least a portion the memory space formerly occupied by application 230b.

A customer order may also include an application 230d that is not included in the image shown in FIG. 2a. Accordingly, application 230d is loaded onto the storage device to result in contents 206 shown in FIG. 2d. The contents of application 230d are copied directly into one or more directories on the storage device.

Referring back to FIG. 1a, the programs on storage device 100 are integrated into the operating system during an integration phase subsequent to any programs being removed from image 102 on storage device 100 and added to storage device 100. The operating system on storage device 100 is booted. The operating system may perform a plug-n-play detection to detect devices on build-to-order computer system 120. The operating system may cause one or more drivers to be integrated for each device it detects. The integration list is then used to cause each program to be integrated into the operating system. The tasks performed to integrate a program into an operating system during the integration phase may differ for different operating systems. In a Windows operating system such as Windows 2000, Windows NT, Windows 98, and Windows 95, for example, a program may be integrated by storing registry, desktop, and start menu information associated with the program into designated areas on storage device 100. In other operating systems, other information may be created, modified, or stored as required by an operating system.

Subsequent to the integration phase being completed, verification tests are performed on build-to-order computer system 120, and system 120 is resealed and sent to the customer.

Figure 1B:
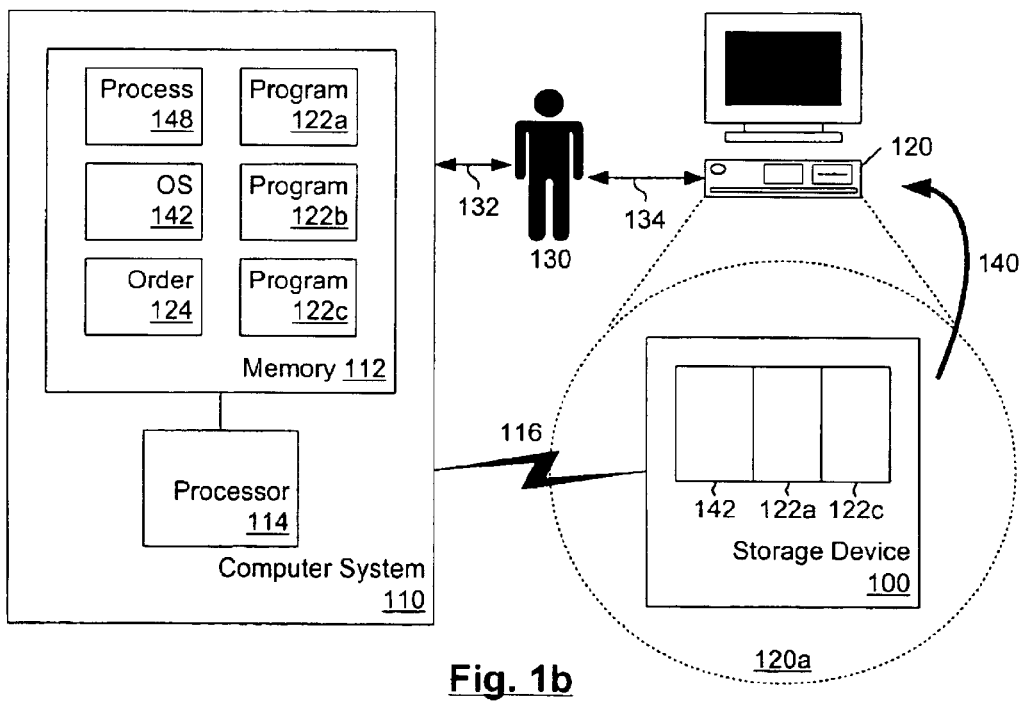
FIG. 1b is a diagram illustrating a second embodiment of a storage device coupled to a computer system.

FIG. 1b is a diagram illustrating a second embodiment of a storage device 100 coupled to a computer system 110. Computer system 110 includes a processor 114 coupled to a memory 112. Memory 112 includes process 148, program 122a, program 122b, program 122c, operating system 142, and order information 124. Storage device 100 is coupled to computer system 110 using a connection 116. Connection 116 may be any suitable component, device, or system for operatively coupling computer system 110 and storage device 100 such as a cable, a local area network, a global communications network such as the Internet, or a wireless communications system. In one embodiment, storage device 100 is included in a build-to-order computer system 120. In this embodiment, build-to-order computer system 120 is coupled to computer system 110 via connection 116. In an alternative embodiment, storage device 100 is directly coupled to computer system 110 via connection 116. In this alternative embodiment, storage device 100 is eventually installed in build-to-order computer system 120. Computer system 110 and build-to-order computer system 120 are each configured to receive inputs from and provide outputs to a user 130 as indicated by 132 and 134, respectively.

In the embodiment of FIG. 1b, storage device 100 may be any suitable device or devices configured to store one or more programs such as a hard disk drive or another type of magnetic storage device, a redundant array of inexpensive drives (RAID) system, or an optical storage device.

As in FIG. 1a, the process of installing software onto storage device 100 for use in build-to-order computer system 120 described in FIG. 1b is divided into two mutually exclusive phases—a copy phase and an enumeration phase. Instead of using image 102 to copy an operating system and a set of programs in bulk as in FIG. 1a, an operating system and a set of programs are layered onto storage device 100 in a pre-integrated state in FIG. 1b.

Operating system 142 and one or more of programs 122a, 122b, and 122c are copied onto storage device 100 over connection 116 by process 148 as shown by operating system 142 and programs 122a and 122c being included in storage device 100. In one particular embodiment, operating system 142 and one or more of programs 122a, 122b, and 122c may be copied onto storage device 100 by a vendor of the storage device prior to storage device 100 being received by a computer manufacturer. Subsequent to this copy phase, an integration phase may be performed to integrate the programs on storage device 100 into operating system 142.

In a build-to-order manufacturing model, a customer specifies the set of programs to be included in build-to-order computer system 120. The set of programs desired by a customer is included in order information 124 and may be stored in order information 124 as an order list. The order list is used to select the programs 122a, 122b, and or 122c to be loaded onto build-to-order computer system 120. In the example shown in FIG. 1b, operating system 142 and programs 122a and 122c have been selected by the customer and loaded onto storage device 100. Programs 122a and 122c are each loaded onto storage device 100 by copying their contents directly into one or more directories on storage device 100 without the need to copy the contents into a temporary directory. In addition, an entry associated with each program is added to an integration list to cause the program to be integrated into an operating system during the integration phase. Although not loaded onto storage device 100 in this example, program 122b is shown in FIG. 1b to illustrate that other programs may be stored on computer system 110 and may be caused to be loaded onto storage device 100 by process 148.

The programs on storage device 100 are integrated into the operating system during an integration phase subsequent to the copy phase. The operating system on storage device 100 is booted. The operating system may perform a plug-n-play detection to detect devices on build-to-order computer system 120. The operating system may cause one or more drivers to be integrated for each device it detects. The integration list is then used to cause each program to be integrated into the operating system. The tasks performed to integrate a program into an operating system during the integration phase may differ for different operating systems. In a Windows operating system such as Windows 2000, Windows NT, Windows 98, and Windows 95, for example, a program may be integrated by storing registry, desktop, and start menu information associated with the program into designated areas on storage device 100. In other operating systems, other information may be created, modified, or stored as required by an operating system.

Subsequent to the integration phase being completed, verification tests are performed on build-to-order computer system 120, and system 120 is resealed and sent to the customer.

Figure 3:
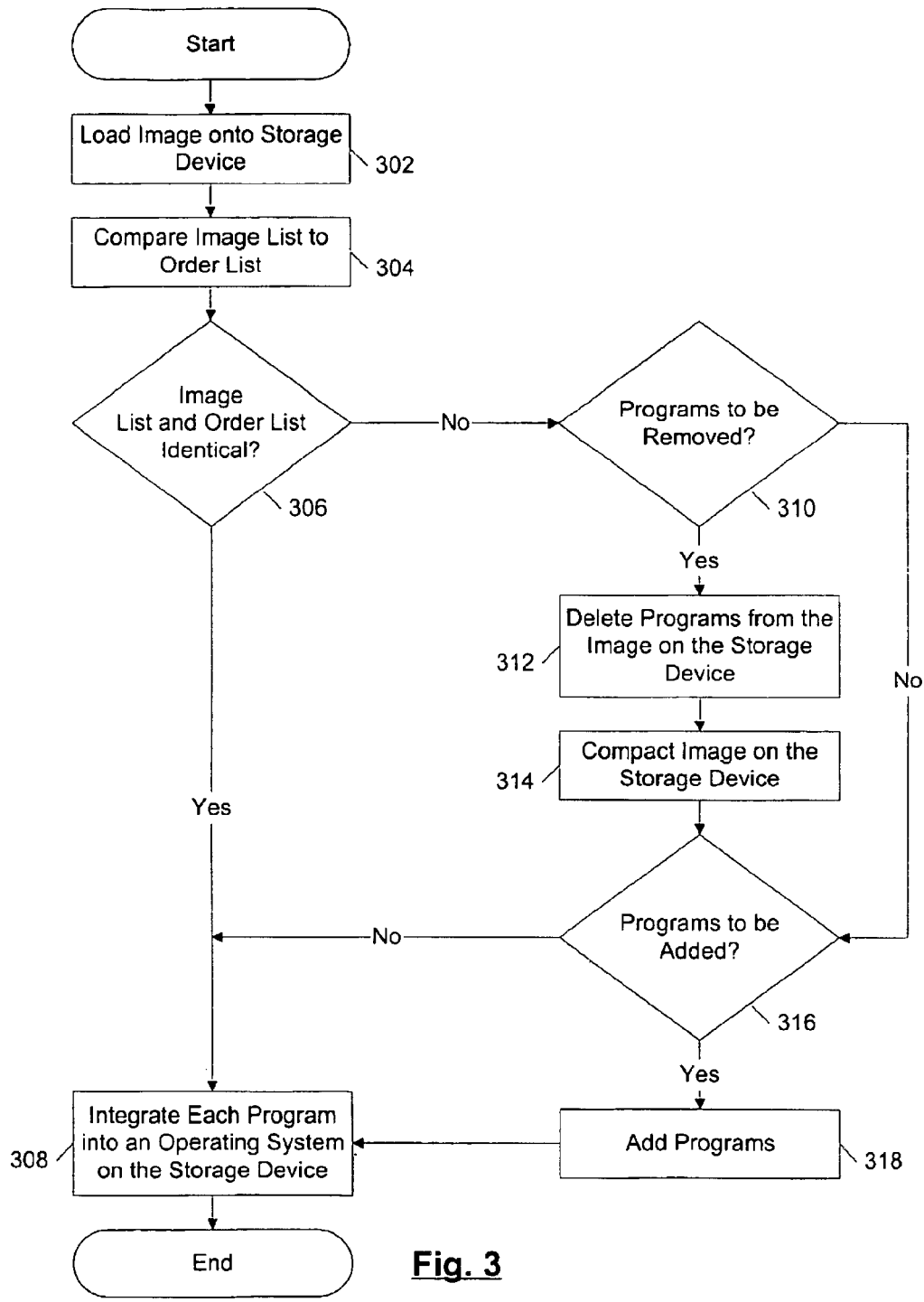
FIG. 3 is a flowchart illustrating an embodiment of a method for installing programs onto a build-to-order computer system.

FIG. 3 is a flowchart illustrating an embodiment of a method for installing programs onto a build-to-order computer system. In FIG. 3, an image is loaded onto a storage device as indicated in step 302. An image list associated with the image is compared to an order list as indicated in step 304. The order list may be generated from order information provided by a customer for a build-to-order computer system. The order list contains a list of programs that should be included in the build-to-order computer system. The image list includes a list of at least some of the programs that are included in the image. A determination is made as to whether the image list and the order list are identical as indicated in step 306. The image list and the order list are identical if neither list includes a program that the other does not include. If the image list and the order list are identical, then no additional programs need to be added and no programs need to be deleted from the image. Each program is integrated into an operating system of the storage device as indicated in step 308.

If the image list and the order list are not identical, then a determination is made as to whether one or more programs need to be removed from the image on the storage device as indicated in step 310. If one or more programs need to be removed from the image on the storage device, then the program or programs are deleted from the image on the storage device as indicated in step 312. The remaining image on the storage device is compacted as indicated in step 314. Certain embodiments may omit step 314. If there is no program to be removed from the image on the storage device, then steps 312 and 314 are omitted as indicated.

A determination is made as to whether one or more programs are to be added as indicated in step 316. If one or more programs are to be added, then the programs are added to the storage device as indicated in step 318. If there is no program to be added, then step 318 is omitted as indicated. Each program, including the programs remaining in the image and those added, is integrated into an operating system of the storage device as indicated in step 308.

Figure 4:
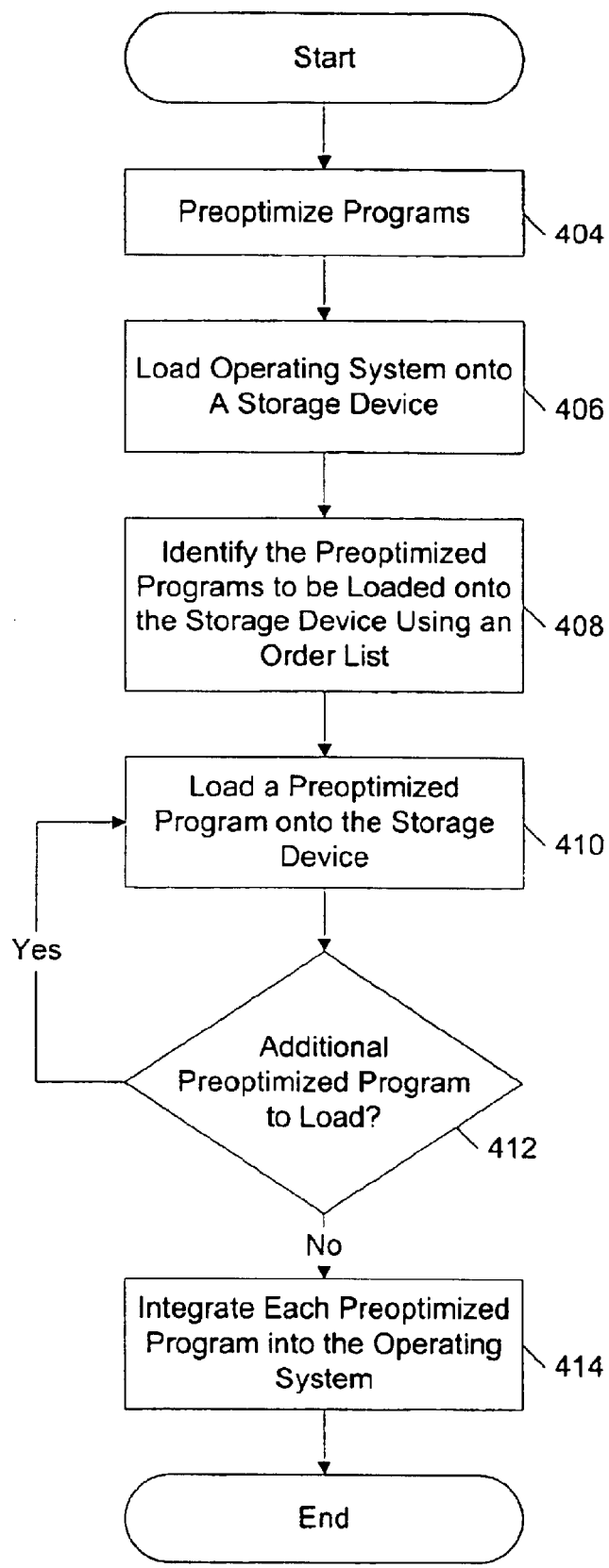
FIG. 4 is a flowchart illustrating an embodiment of a method for installing programs onto a build-to-order computer system.

FIG. 4 is a flowchart illustrating an embodiment of a method for installing programs onto a build-to-order computer system. One or more programs are preoptimized as indicated in step 404. A program is preoptimized by identifying one or more directories where the contents of the program are to be copied in response to the program being loaded onto a storage device. The contents of a preoptimized program, such as program files, may be copied directly into these directories without the need for copying the contents into a temporary directory.

An operating system is loaded onto a storage device as indicated in step 406. The preoptimized programs that are to be loaded onto the storage device are identified using an order list as indicated in step 408. The order list is generated from order information provided by a customer for a build-to-order computer system. The order list contains a list of programs that should be included in the build-to-order computer system. A preoptimized program is loaded onto the storage device as indicated in step 410. The preoptimized program is loaded by copying its contents directly into one or more directories on the storage device. Certain of these one or more directories may be created on the storage device as part of loading the preoptimized program onto the storage device. A determination is made as to whether there is an additional preoptimized program to load as indicated in step 412. If there is an additional preoptimized program to be loaded, then step 410 and step 412 are repeated. If there are no additional preoptimized programs to be loaded, then each preoptimized program on the storage device is integrated into the operating system as indicated in step 414.

Figure 5A:
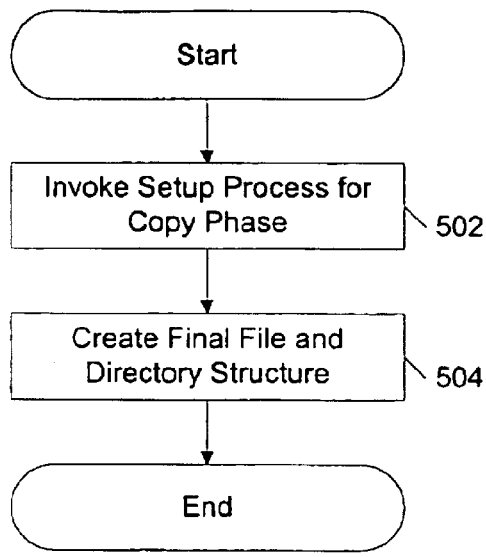
FIG. 5a is a flowchart illustrating an embodiment of a method for performing a first phase of installing programs onto a storage device.

FIG. 5a is a flowchart illustrating an embodiment of a method for performing a first phase of installing programs onto a storage device. A setup process for a copy phase is invoked as indicated in step 502. The setup process is configured to determine one or more directories on a storage device where the contents of a program are to be copied. A final file and directory structure is created as indicated in step 504. The final file and directory structure are created by copying the contents of a program directly into the one or more directories identified by the setup process without the need to copy the contents into a temporary directory.

Figure 5B:
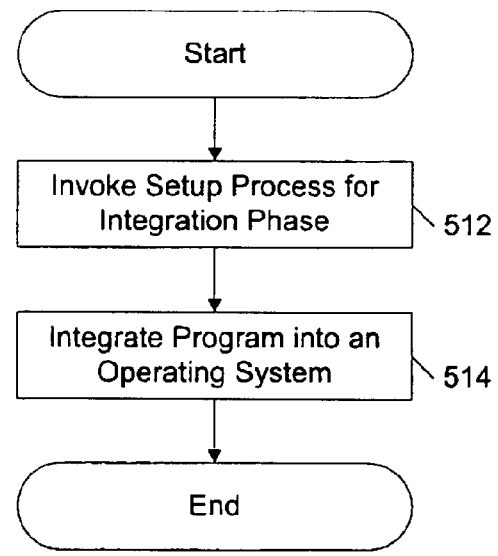
FIG. 5b is a flowchart illustrating an embodiment of a method for performing a second phase of installing programs onto a storage device.
Figure 1A:
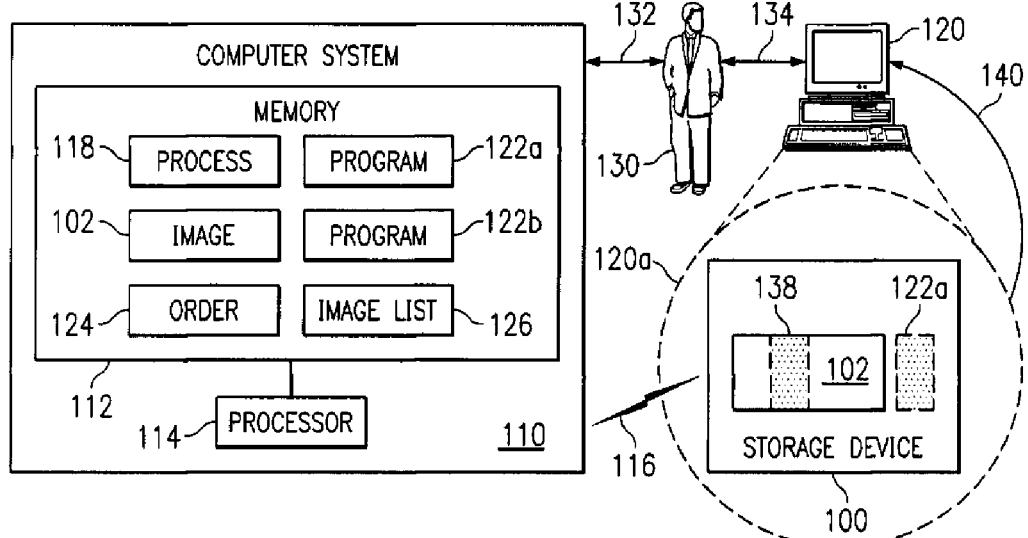
Figure 1B:
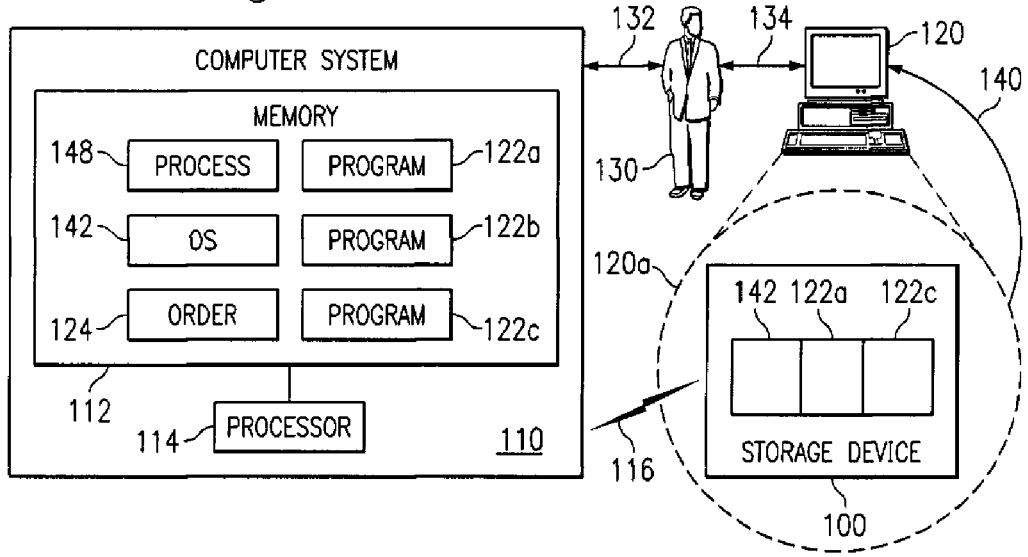
Figure 5A:
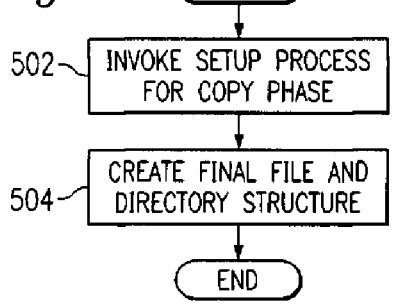
Figure 5B:
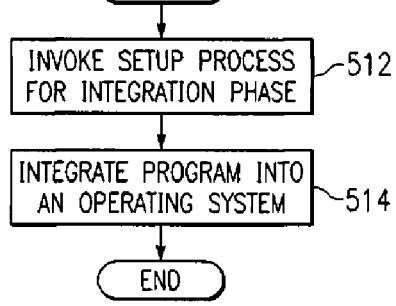

FIG. 5b is a flowchart illustrating an embodiment of a method for performing a second phase of installing programs onto a storage device. A setup process for an integration phase is invoked as indicated in step 512. The setup process is configured to cause a program to be integrated into an operating system. A program is integrated into an operating system as indicated in step 514. Integrating an application into an operating system may include creating a registry entry, a desktop item, and a start menu item, depending on the operating system.

The phases described in FIGS. 5a and 5b may be made entirely independent of one another by using switches to cause the phases to be separately performed. For multi-lingual installations, a switch may be added to support language grouping and force a given language for the installation. Once the file structure is captured for a given language of a program, the contents of the program can be loaded onto a storage device free of any file fragmentation and in a "ready to integrate" into the operating system state. The copy phase may also produce a file list or manifest that contains a complete listing of the file and directory structure created for a program.

As can be seen, the principal advantages of these embodiments are that they allow a manufacturer to more efficiently install software in a build-to-order computer system. The software installation process can be performed using two mutually exclusive phases. These phases provide a manufacturer with flexibility in installing software and allow a manufacturer to more efficiently provide a build-to-order computer system. The phases also allow a manufacturer to closely tailor the software installation process to the rigors of a build-to-order model.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

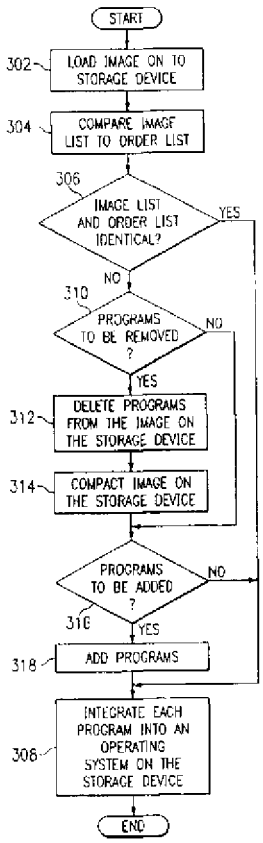

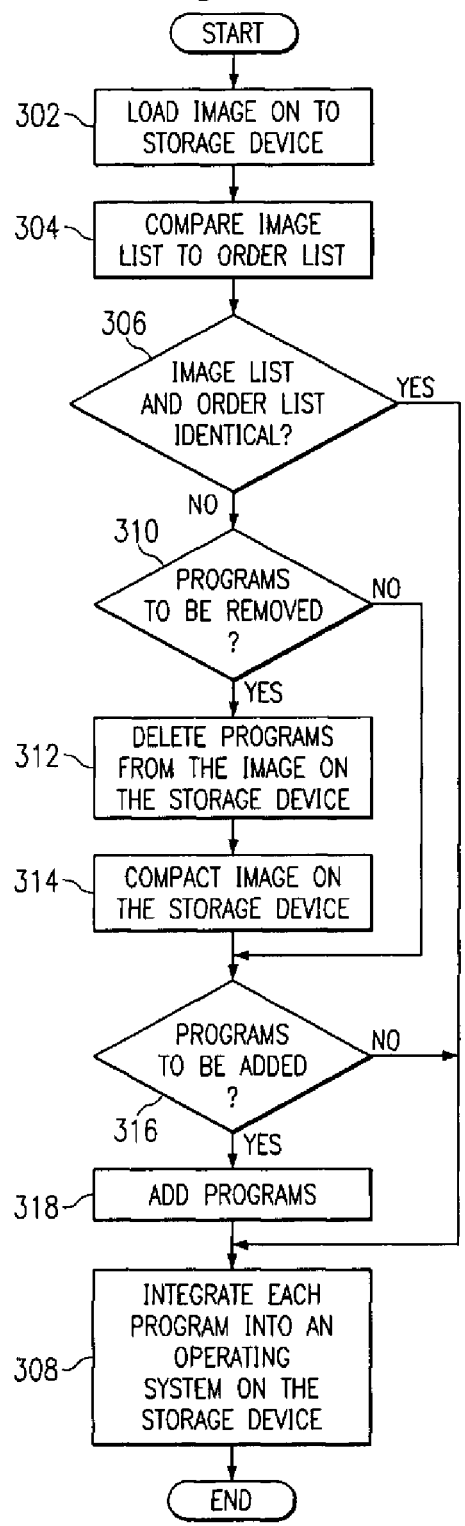
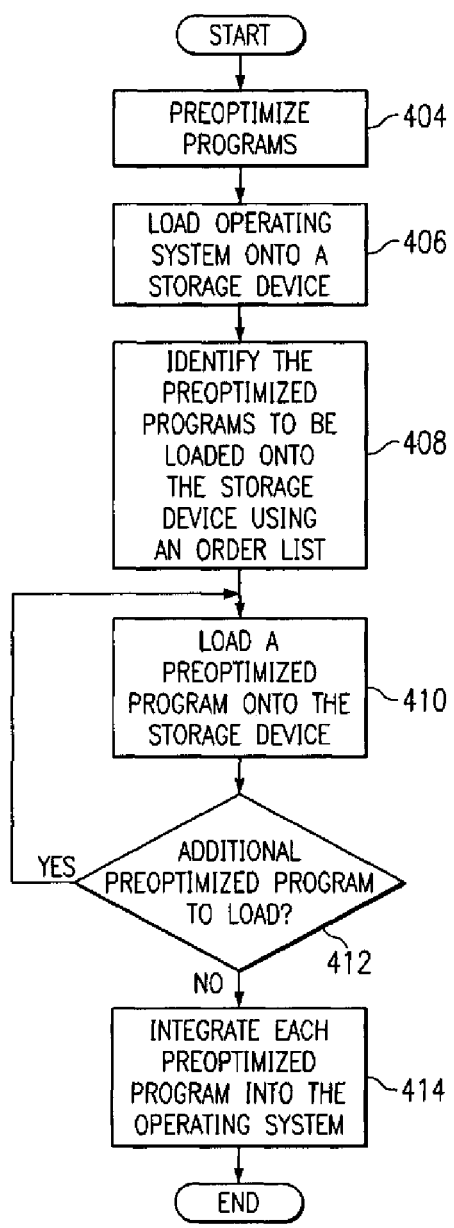

What is claimed is:

1. A method of installing software comprising:
   receiving a storage device;
   performing a first file copy phase of installing programs onto the storage device to optimize file structure to support an application;
   configuring a first setup process to determine at least one directory on the storage device for copying contents of a program;
   performing a second enumeration phase of installing programs onto the storage device to enumerate registry, desktop and start menu items;
   configuring a second setup process to cause a program to be integrated into an operating system; and
   providing mutually exclusive switches, one switch to perform the copy phase only and another switch to perform the enumeration phase only with the assumption that the copy phase has been performed.

2. The method of claim 1 including a final file and directory structure.

3. The method of claim 2, further comprising:
   creating the final file and directory structure by copying a program directly into one or more of the directories.

4. The method of claim 3 wherein the first and second phases are independent of each other.

5. The method of claim 1, further comprising:
   for multi-lingual installations, adding a switch to support language grouping and to force a given language for the installation free of file fragmentation and in a ready-to-integrate state.

6. The method of claim 5 wherein the first and second phases are mutually exclusive.

7. A system for installing software comprising:
   a computer system configured to execute a process; and
   a storage device coupled to the computer system, the storage device including software installed by:
   performing a first file copy phase of installing programs onto the storage device to optimize file structure to support an application;
   configuring a first setup process to determine at least one directory on the storage device for copying contents of a program;
   performing a second enumeration phase of installing programs onto the storage device to enumerate registry, desktop and start menu items;
   configuring a second setup process to cause a program to be integrated into an operating system; and
   providing mutually exclusive switches for performing each phase including performing the enumeration phase only with the assumption that the copy phase has been performed.

8. The system of claim 7, including a final file and directory structure.

9. The system of claim 8 further comprising:
   the final file and directory structure being created by copying a program directly into one or more of the directories.

10. The system of claim 7 further comprising:
    a switch added to support language grouping and to force a given language for multi-lingual installations free of file fragmentation and in a ready-to-integrate state.

11. The system of claim 10, wherein the first and second phases are mutually exclusive.

* * * * *

UNITED STATES PATENT AND TRADEMARK OFFICE
CERTIFICATE OF CORRECTION

PATENT NO.        : 6,907,604 B1
APPLICATION NO. : 09/668611
DATED             : June 14, 2005
INVENTOR(S)      : Macnair, Jr. et al.

It is certified that error appears in the above-identified patent and that said Letters Patent is hereby corrected as shown below:

The Title Page, showing an illustrative figure, should be deleted and substitute therefor the attached Title Page.

Please replace drawing sheets 1 through 5 as printed in the issued patent with the drawings that were submitted (copy attached).

Signed and Sealed this

Sixteenth Day of June, 2009

JOHN DOLL
*Acting Director of the United States Patent and Trademark Office*

(12) United States Patent
Macnair, Jr. et al.

(10) Patent No.: US 6,907,604 B1
(45) Date of Patent: Jun. 14, 2005

(54) INSTANT INTEGRATION MODEL

(75) Inventors: Douglas G. Macnair, Jr., Round Rock, TX (US); Rory K. O'Loughlin, Austin, TX (US); Gaston M. Barajas, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 525 days.

(21) Appl. No.: 09/668,611

(22) Filed: Sep. 22, 2000

(51) Int. Cl.⁷ ................................................. G06F 9/45
(52) U.S. Cl. ................................................. 717/175
(58) Field of Search ............................. 717/169, 175; 705/52; 713/2

(56) References Cited

U.S. PATENT DOCUMENTS

| | | | | |
|---|---|---|---|---|
| 5,113,518 A | * | 5/1992 | Durst et al. | 713/200 |
| 5,325,532 A | * | 6/1994 | Crosswy et al. | 713/2 |
| 5,479,612 A | * | 12/1995 | Kenton et al. | 713/200 |
| 5,515,524 A | * | 5/1996 | Lynch et al. | 703/13 |
| 5,748,485 A | * | 5/1998 | Christiansen et al. | 700/234 |
| 5,894,571 A | | 4/1999 | O'Connor | 713/2 |
| 5,970,252 A | * | 10/1999 | Buxton et al. | 717/166 |
| 6,006,035 A | * | 12/1999 | Nabahi | 717/175 |
| 6,067,618 A | * | 5/2000 | Weber | 713/1 |
| 6,134,324 A | * | 10/2000 | Bohannon et al. | 705/52 |
| 6,247,128 B1 | * | 6/2001 | Fisher et al. | 713/100 |
| 6,298,443 B1 | * | 10/2001 | Colligan et al. | 713/200 |
| 6,324,691 B1 | * | 11/2001 | Gazdik | 717/178 |
| 6,418,554 B1 | * | 7/2002 | Delo et al. | 717/174 |
| 6,427,236 B1 | * | 7/2002 | Chamberlain et al. | 717/174 |
| 6,543,047 B1 | * | 4/2003 | Vrhel, Jr. et al. | 717/121 |
| 2002/0013939 A1 | * | 1/2002 | Daynes et al. | 717/11 |
| 2003/0088515 A1 | * | 5/2003 | Cooper et al. | 705/50 |

* cited by examiner

*Primary Examiner*—John Chavis
(74) *Attorney, Agent, or Firm*—Haynes and Boone, LLP

(57) ABSTRACT

A method that includes receiving a storage device that includes an image is provided. The image is loaded onto the storage device by a vendor of the storage device and includes a first program and a second program. The second program is removed from the image on the storage device in response to comparing an order list to an image list. The first program is integrated into an operating system on the storage device.

11 Claims, 5 Drawing Sheets